Feb. 6, 1945.　　　D. I. WILSON　　　2,368,794
SPRING DRIVEN GUIDE BUSHING
Filed Aug. 2, 1943
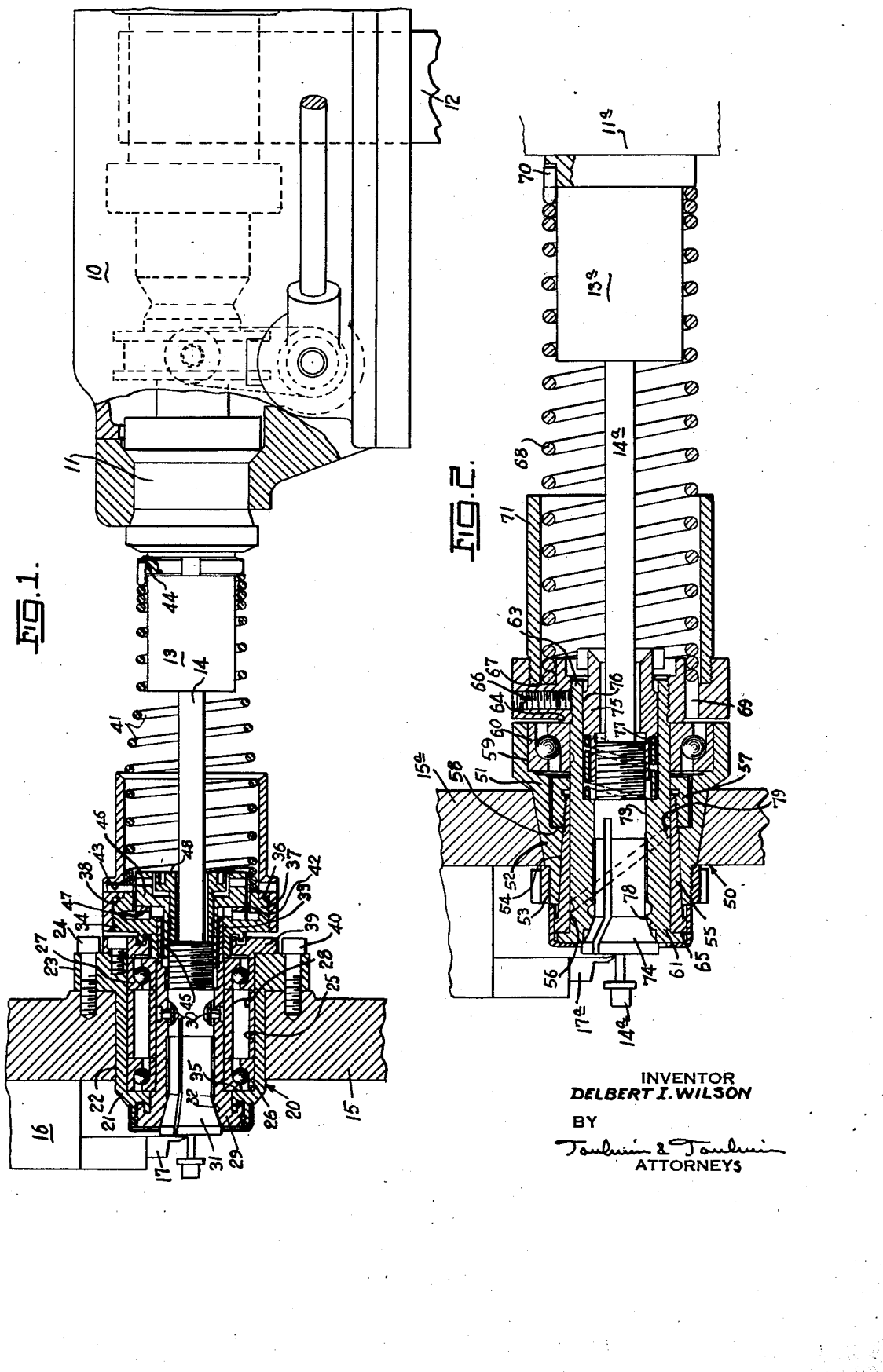
INVENTOR
DELBERT I. WILSON
BY
　　Toulmin & Toulmin
ATTORNEYS Patented Feb. 6, 1945

2,368,794

UNITED STATES PATENT OFFICE 2,368,794

SPRING DRIVEN GUIDE BUSHING

Delbert I. Wilson, Dayton, Ohio, assignor to The City Engineering Company, Dayton, Ohio, a corporation of Ohio Application August 2, 1943, Serial No. 497,016

12 Claims. (Cl. 29—58)

This invention relates to turning machines and particularly to screw machines for high precision work.

An object of the invention is to provide a resilient driving connection between the spindle of the screw machine and a support for the work piece whereby vibration of the work piece relative to a cutting tool is substantially eliminated.

Another object of the invention is to provide a screw machine that has a driven work supporting collet that is connected to the spindle of the machine by means of a resilient driving connection whereby the collet will rotate accurately on its axis of rotation for producing precision work.

Another object of the invention is to provide a screw machine of the type wherein the work rod is fed through a supporting collet by means of intermittent movement of the spindle of the screw machine for advancing the work rod through the collet adjacent work tools for producing turning operations wherein the work supporting collet is driven by means of a spring that extends between the collet and the spindle of the screw machine to eliminate vibration of the collet.

Another object of the invention is to provide an apparatus for accurately producing small work pieces in a high speed turning machine that is constructed and arranged in a manner that the support member for the work stock is driven at the same high speed of the work stock by means of a resilient connection between the work stock support member and the driving means for the same whereby all machine vibration is eliminated from the work stock supporting member to thereby produce precision concentric turning operations.

Another object of the invention is to provide a screw machine of the type that has a reciprocating spindle head for feeding work stock through a work support member for turning operations wherein the spindle of the machine drives the work stock support member by means of a coiled spring that extends between the spindle and the work stock support member.

Further objects and advantages will become apparent from the drawing and the following description.

In the drawing

Figure I is a longitudinal vertical cross-section of a portion of a screw machine mechanism including the spindle head and the work stock support member, Figure II is a vertical longitudinal cross-section of a work stock support member and the means for driving the same that is constructed in a modified manner from that shown in Figure I.

This invention is particularly adapted for use on screw machines of the type that have a spindle head that is mounted upon the bed of the machine for reciprocating thereon, which spindle head is constructed and arranged in a manner that the work stock is fed axially through the spindle head by the reciprocatory movement of the same. It is, of course, understood that the spindle mounted within the spindle head is provided with the usual collet arrangement for engaging the work stock as it passes axially through the spindle so that the work stock will be fed thereby. In screw machines of this type it is preferable to have a work stock support member that is mounted adjacent the turning tools of the machine so that when the work stock is fed axially through the work stock support member that the work stock will be held concentric with respect to the axis of the work stock support mechanism for producing precision turning operations. The spindle head of the machine is adapted to be reciprocated through a predetermined stroke as determined by the length of the work piece that is being produced, and suitable mechanism can be provided for producing this reciprocation in conventional manner.

In conventional practice it has been customary to rotate the work stock within a work stock support member that was stationarily mounted so that the work stock was actually bearinged in the work stock support member. Also there has been provided "live" collet members for supporting the work stock whereby there was no relative movement between the work stock and the support member, and also auxiliary bearinged devices were provided for supporting the work stock support member for rotation relative to the stationary support. When using the live collets it has been the conventional practice to drive the collet from the spindle of the screw machine through means of a rigid connection. Such constructions have, however, produced inconsistent results in turning operations because of the vibration and unbalance that was produced by the rotation of the driving member.

In this invention there is provided a resilient coiled spring disposed between the live collet and the spindle of the screw machine for driving the live collet. This resilient driving connection between the spindle and the live collet breaks any solid driving connection therebetween so that any vibration of the machine that would be transmitted through the spindle cannot be transmitted to the collet by the driving connection. Also, the resilient spring provides means whereby the rotation of the collet is exceedingly well balanced, and what may be termed internal vibration of the collet is substantially eliminated, so that exceedingly small work can be turned with accurate concentricity.

The theory of operation of the resilient driving connection between the spindle of the screw machine and the live collet has not been thoroughly understood, but it has been demonstrated upon screw machines that the resilient connection will permit more accurate production of small pieces than when the live collet is driven by conventional rigid driving connections. In fact, it has been demonstrated that a live collet that was slightly off balance could be made to accurately turn small diameter work pieces when the collet was driven by means of a spring rotating at the same high speed as the collet. The explanation for this phenomenal result would seem to reside in the fact that since a coiled spring is an exceedingly flexible member that each turn of the coil spring balances itself when operating at high speed and as a result the spring unit produces a balancing of the collet that it is driving. Articles as small as .0019 inch in diameter have been produced on screw machines constructed in accordance with the invention, and it is not unusual to produce a turning operation on work stock that may produce an article of .004 inch in diameter having a length of as much as seven-eighths of an inch. Such highly accurate turning operations could not be produced if there was the slightest vibration of the collet so that the unexpected result in this invention is the balancing effect that the rotating spring has upon the collet.

As illustrated in the drawing, this invention consists of a spindle housing 10 of a screw machine that is adapted to be mounted upon the bed of the machine for reciprocation thereupon in conventional manner. The housing 10 carries a spindle 11 that is driven by means of a driving belt 12. It is, of course, understood that the spindle 11 of the screw machine may be of any conventional construction for high speed rotation and that it is provided with the usual collet or chuck 13 that grips the work stock 14 for driving the same at the speed of rotation of the spindle. It will also be understood that the collet or chuck 13 is constructed and arranged in a manner that when the spindle head 10 is retracted, or reciprocated, in a rightward direction as viewed in the drawing, that the work stock 14 will be released so that the collet or chuck 13 can take a new grip upon the work stock 14 for another advancing stroke when the spindle head 10 is again moved in a forward direction.

A stationary support member 15 is provided forward of the spindle head 10 and carries a work stock support member 20. The stationary support member 15 is secured to the bed of the screw machine in any conventional manner so that the spindle head 10 will be reciprocated toward and away from the support member 15 during normal operation of the screw machine.

The support member 15 also carries the tool support member 16 that is provided with turning tools 17 for producing turning operations upon the work stock 14 as it passes by the turning tool 17.

As illustrated in Figure I the work stock support member 20 consists of a cylindrical housing 21 that has a cylindrical body 22 extending through an opening in the support member 15, a flange 23 on the body 22 being secured to the support member 15 by means of bolts 24. The body 22 of the support member 20 has an internal bore 25 that is adapted to receive a pair of ball bearing members 26 and 27 that are spaced by means of a pair of sleeves 28.

The ball bearing members support a rotatable sleeve 29 that has a pair of keys 30 extending toward the axis thereof to engage a collet 31 that is disposed within the interior of the sleeve 29. The front end of the sleeve 29 is provided with a tapered wall 32 that receives the taper on the collet 31, while the rear end of the sleeve 29 is provided with a threaded portion 33 that threadedly receives a ring member 34.

The ring member 34 has the forward end thereof in engagement with the bearing member 27 to draw the shoulder 35 on the sleeve 29 against the forward bearing member 26 and thereby accurately hold the sleeve 29 between the bearing members 26 and 27.

The ring member 34 is provided with an external thread 36 that receives an internally threaded sleeve member 37 which extends rearwardly of the ring member 34 and has a shoulder 38 that engages the ring member 34 to securely hold the sleeve 37 upon the ring 34. The ball bearing members 26 and 27 are retained in the internal bore 25 of the body 22 by means of the annular ring 39 secured to the flange 21 by means of the bolts 40.

The sleeve 37 surrounds one end of a coiled spring 41 that has one end thereof engaging an inwardly extending annular flange 42 provided on the ring member 34 whereby the thrust of the spring member 41 will be taken through the ring member 34 to the ball bearings 26 and 27. The extreme end of the spring 41 is bent upwardly and extends through a hole 43 provided in the sleeve 37 whereby the spring 41 will drive the sleeve 37 when rotated.

The opposite end of the spring 41 surrounds the collet or chuck 13 of the spindle 11 and has the extreme end thereof positioned in a slot or hole 44 in the chuck 13. It will be noted that the spring 41 is of such a diameter that it closely fits the internal diameter of the sleeve 37 and the opposite end of the spring on the chuck 13 is of a diameter that closely fits the chuck whereby vibration of the spring at the ends thereof will be held to a minimum.

The collet 31 is provided with key ways in the body thereof to receive the keys 30 extending from the sleeve 29 and has the threaded end thereof engaged by the internally threaded sleeve portion 45 of the ring member 46. A flat Belville spring 47 is positioned between the ring 46 and the ring 34 whereby the collet 31 will be urged in a rightward direction by a predetermined force according to the adjustment of the ring 46 upon the collet 31 to compress the Belville spring 47. A locking sleeve 48 is threaded within the sleeve 46 to engage the end of the collet 31 and hold the aforementioned adjustment when obtained.

As illustrated in Figure II there is illustrated a modified structure of a work stock support member wherein a sleeve bearing is provided with in which the work stock support member rotates as driven by a resilient coiled spring for producing extremely accurate turning operations.

In this apparatus the work stock support member 50 is provided with a cylindrical body 51 having a tapered portion 52 that extends within a tapered bore provided in the stationary support member 15a. The forward end of the body 51 is threaded to receive the nut 53 for securing the body 51 to the support member 15a.

The body 51 is provided with an internal tapered bore 54 that receives an externally tapered bearing sleeve 55 that may be of the split sleeve type for adjusting the internal diameter of the bearing bore 56. The rear end of the tapered sleeve 55 is threaded to receive a nut 57 that engages a shoulder 58 provided in the body 51 to draw the tapered sleeve 55 within the tapered bore 54 in the body 51.

The body 51 is provided with an internal recess 59 that receives a ball bearing 60 which provides a thrust bearing in a manner hereinafter referred to. A rotating sleeve 61 is positioned within the bearing bore 56 of the bearing sleeve 55 and extends rearwardly therethrough to receive an annular ring 62 that is threaded upon the threaded end 63 of the sleeve 61. A shoulder 64 is provided on the ring 62 to engage the ball bearing 60 whereby the rotating sleeve 61 may be drawn in a rightward direction to cause the flanged shoulder 65 to engage the forward end of the bearing sleeve 55 to thereby retain the rotating sleeve 61 accurately between the split bearing sleeve 55 and the ball bearing 60. A set screw 66 is provided in the ring 62 to hold the adjustment after it has been obtained.

The ring member 62 has an annular recess 67 that receives one end of a coiled spring 68, the extreme end 69 of the spring 68 extending into a hole in the bottom wall of the recess 67 whereby the spring 68 and the ring 62 will rotate as a unit. The opposite end of the spring 68 surrounds the collet or chuck 13a of the spindle 11a and is supported thereby. The end 70 of the spring 68 rests in a recess provided in the body of the chuck 13a whereby the spring 68 will be rotated with the spindle 11a.

A sleeve 71 has the forward end thereof threaded and inserted into the threaded wall 72 of the recess 67 whereby the sleeve 71 encloses a portion of the spring 68 to prevent the same from whipping when rotating at a high speed.

The rotatable sleeve 61 has an internal bore 73 that receives the collet 74, the rear end of the collet 74 being threaded within a sleeve 75 that slides within an internal bore 76 in the sleeve 61. A spring 77 is positioned within the bore 76 between the sleeve 75 and the sleeve 61 to urge the collet 74 in a rightward direction whereby the tapered head on the collet engages the tapered wall 78 in the sleeve 61 to cause the collet to engage the work stock 14a extending therethrough with a predetermined force. Lubricating grooves 79 are provided around the external surface of the rotating sleeve 61 for properly lubricating the bearing surface between it and the sleeve bearing 55.

While the structure of the devices herein described varies somewhat yet the operation of the device is the same. It is, of course, readily understood that where extremely accurate work is desired that the sleeve bearing type of bearing support is preferable to the ball bearing type of support because at high speeds there is an inherent vibration of the ball bearings which is reflected upon the work. Of course, the ball bearing support has a greater life than the sleeve bearing support but the extreme accuracy obtained in the sleeve bearing support in combination with the drive mechanism of this invention warrants the use of the bearing member having the shorter life when extreme accuracy is desired.

Referring to the structure in Figure I, it will be seen that when the spindle 11 is rotated by the drive belt 12 that the spring 41 will be driven thereby since the end 44 of the spring engages the collet or chuck 13. Driving of the spring 41 by means of the spindle 11 causes the sleeve 37 to be driven by the opposite end of the spring that extends into the hole 43 provided in the sleeve 37. This rotation of the sleeve 37 will in turn drive the ring 34 and the sleeve 29 to thus drive the collet 31 through the keys 30. The coil spring 41 provides a completely resilient drive means between the spindle 11 and the collet 31 so that any axial vibration of the spindle 11, or torsional vibration, will not be transmitted to the collet 31 through the driving connection. As previously described the spindle head 10 moves toward the work stock support member 20 when an article is to be produced by causing the work stock to move past the turning tool 17. Therefore, the work stock 14 will be moved axially through the collet 31 and since the spring 47 provides a predetermined engaging force to be applied upon the work stock 14 within the collet 31, the work stock will be held accurately concentrically within the work stock support member 20. Also, the force with which the work stock 14 is gripped by means of the collet 31, but which permits axial sliding movement of the work stock therein, will prevent vibration of the work stock within the collet 31.

It will be apparent that the resilient driving connection between the work stock support member and the spindle 11 provided by the spring 41 will permit reciprocation of the spindle head 10 without in any way affecting the drive between the spindle 11 and the collet 31. The high speed of rotation of the spring 41 will absorb any vibration caused by off balance of the elements that are connected thereto and it apparently acts like a flywheel to absorb and dissipate these vibrations so that the element that is being driven by the spring 41 will rotate accurately concentrically upon its axis.

The functioning just described of the driving operation of the spring 41 illustrated in Figure I holds true of the functioning of the spring 68 illustrated in Figure II. In Figure II the spring 68 drives the collet 74 carried in the sleeve 61 through means of the ring 62 that is secured to the sleeve 61, the sleeve and the collet rotating as a unit. In the latter instance, however, it will be noted that the sleeve bearing provided by the bearing member 55 will, as is usual in all sleeve bearings, increase the accuracy with which the collet 74 will be rotated.

In both structures disclosed in this invention the thrust of the driving springs is taken by the driving sleeve that supports the collet so that the sliding engagement between the collet and the work stock will not be affected when the driving spring is compressed or released during reciprocation of the spindle head 10 when feeding the work stock.

While the apparatus disclosed and described herein constitute preferred forms of the invention, yet it will be understood that the mechanical features of the apparatus can be changed without departing from the spirit of the invention, and that all such modifications as fall within the scope of the appended claims are intended to be included herein.

Having thus fully described my invention what

I claim as new and desire to secure by Letters Patent is:

1. In a screw machine the combination of, a rotating spindle adapted to engage work stock for driving same, a work stock support member including means completely independent of said spindle for rotatably supporting the work stock within said member, and a coiled spring driving connection extending between said spindle and said rotating means to thereby drive and balance the same.

2. In a screw machine the combination of, a rotating spindle, rotatable means completely independent of said spindle for supporting work stock adapted to extend from said spindle, and a coiled spring means positioned coaxially between said spindle and said rotatable means and connected thereto whereby said rotatable means is driven by said spindle through said spring means and is balanced by said spring means to remove vibration from said rotatable means.

3. In a screw machine the combination of, a rotatable spindle adapted to have work stock extend axially therefrom, a rotatable work stock support member independent of said spindle, means rotatably supporting said support member coaxially with said spindle, said spindle being movable toward and away from said work stock support member to feed work stock therethrough, and a resilient driving connection between said spindle and said rotatable means for driving the same which consists of a coiled spring positioned coaxially with said spindle and said rotatable means.

4. The combination of, a rotatable work stock support member adapted to have work stock extend therethrough, stationary means including means for rotatably supporting said support member, rotatable spindle means adapted to have work stock extend axially therefrom and movable toward said support member during operation thereof for moving work stock therethrough concomitant with performance of a work operation thereon, and a resilient driving connection coaxially arranged with respect to said spindle and said rotatable work stock supporting means for continuously driving the supporting means during all movement of the spindle which consists of a compressible coiled spring.

5. In a screw machine the combination of, a rotatable spindle adapted to have work stock extend axially therefrom, a stationary support member relatively to which said spindle is reciprocable for advancing work stock carried thereby during a turning operation on the machine, rotatable means carried by said member in coaxial alignment with said spindle for supporting work stock extending therefrom, and a coiled spring extending between said spindle and said rotatable means for driving the same therefrom irrespective of the position of reciprocation of said spindle relatively to said support member.

6. In a screw machine the combination of, a rotatable spindle adapted to have work stock extend axially therefrom, a stationary support member relatively to which said spindle is reciprocable for advancing work stock carried thereby during a turning operation on the machine, rotatable means carried by said member in coaxial alignment with said spindle for supporting work stock extending therefrom, means carried by said rotatable means for engaging work stock extending therethrough slidingly but with a predetermined pressure, and a coiled spring extending between said spindle and said rotatable means for driving the same therefrom irrespective of the position of reciprocation of said spindle relatively to said support member.

7. In a screw machine the combination of, a rotatable spindle adapted to have work stock extend axially therefrom, a stationary support member relatively to which said spindle is reciprocable for advancing work stock carried thereby during a turning operation on the machine, rotatable means carried by said member in coaxial alignment with said spindle for supporting work stock extending therefrom, means carried by said rotatable means for engaging work stock extending therethrough slidingly but with a predetermined pressure, a coiled spring extending between said spindle and said rotatable means for driving the same therefrom irrespective of the position of reciprocation of said spindle relatively to said support member, and means to absorb the varying thrust of said spring upon compression of the same caused by reciprocation of said spindle to prevent this thrust from being transmitted to said means for engaging the work stock.

8. In a turning machine the combination of; a stationary support member; a rotatable spindle movable toward said stationary support member during a turning operation to feed work stock carried thereby and extending from the end thereof past a cutting tool; a work stock support member independent of said spindle for supporting work stock extending from said spindle carried in said support and consisting of, bearing means carried by said support member, rotatable means supported by said bearing means and adapted to receive a collet for supporting work stock that extends from said spindle; and spring means coaxial with said spindle and said rotatable means and engaging the same whereby to drive said rotatable means from said spindle and balance the rotatable means to eliminate vibration thereof.

9. In a screw machine the combination of, a spindle head including a spindle that is reciprocable with respect to the machine and is adapted to have work stock extend axially therethrough that is fed axially by the spindle during a turning operation on the machine, a stationary support member relatively to which said spindle is reciprocable, means carried by said stationary support for supporting work stock that extends from said spindle including means rotatably supporting said work stock support means in said stationary support coaxially with said spindle, and a circular coiled spring positioned coaxially between said spindle and said rotatable means and drivingly interconnecting the same to drive the rotatable means and balance the same to eliminate vibration thereof.

10. In a screw machine the combination of, a spindle head including a spindle that is reciprocable with respect to the machine and is adapted to have work stock extend axially therethrough that is fed axially by the spindle during a turning operation on the machine, a stationary support member relatively to which said spindle is reciprocable, means carried by said stationary support for supporting work stock that extends from said spindle including means rotatably supporting said work stock support means in said stationary support coaxially with said spindle consisting of a pair of spaced ball bearing members, and a circular coiled spring positioned coaxially between said spindle and said rotatable means and drivingly interconnecting the same to drive the rotatable means and balance the same to eliminate vibration thereof.

11. In a screw machine the combination of, a spindle head including a spindle that is reciprocable with respect to the machine and is adapted to have work stock extend axially therethrough that is fed axially by the spindle during a turning operation on the machine, a stationary support member relatively to which said spindle is reciprocable, means carried by said stationary support for supporting work stock that extends from said spindle including means rotatably supporting said work stock support means in said stationary support coaxially with said spindle consisting of a sleeve bearing member, and a circular coiled spring positioned coaxially between said spindle and said rotatable means and drivingly interconnecting the same to drive the rotatable means and balance the same to eliminate vibration thereof.

12. The combination of, a stationary support member, means for slidably supporting work stock, means rotatably supporting said means upon said stationary support, spindle means adapted to have work stock extend therefrom for support within said work stock support means and reciprocable with respect to said stationary support, coiled spring means drivingly engaging said rotatable support means and said spindle means and co-axial therewith whereby to drive said support means from said spindle means, and sleeve means extending from said rotatable means for partially enclosing said spring means to thereby prevent substantial axial deflection of said spring means.

DELBERT I. WILSON.